UNITED STATES PATENT OFFICE.

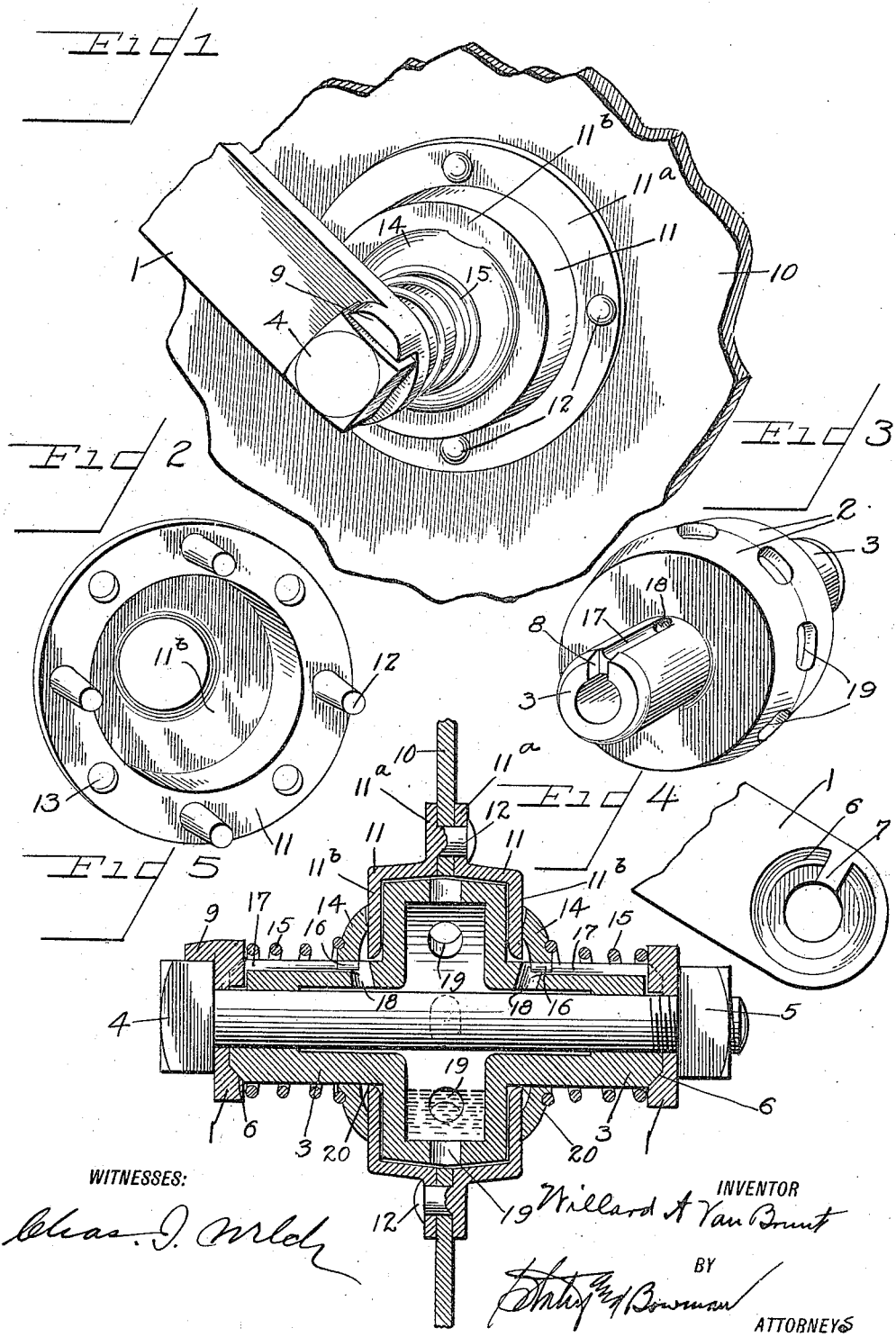

WILLARD A. VAN BRUNT, OF LOS ANGELES, CALIFORNIA.

BEARING FOR GROUND-WORKING DISKS.

1,301,339.      Specification of Letters Patent.      Patented Apr. 22, 1919.

Application filed April 1, 1918. Serial No. 225,921.

*To all whom it may concern:*

Be it known that I, WILLARD A. VAN BRUNT, a citizen of the United States, residing at Los Angeles, in the county of Los Angeles and State of California, have invented certain new and useful Improvements in Bearings for Ground-Working Disks, of which the following is a specification.

This invention relates to improvements in bearings especially adapted for colters for plows, disk furrow openers for grain drills, and the like.

The object of the invention is to devise a bearing of the character referred to so constructed that a considerable quantity of lubricating oil may be retained therein, the arrangement being such that the oil will be prevented from escaping from between the bearing surfaces to any appreciable extent.

In the accompanying drawings:—

Figure 1 is a perspective view of a device embodying my improvements.

Fig. 2 is a perspective view of one of the disk hub sections.

Fig. 3 is a perspective view of the bearing proper.

Fig. 4 is a detail of a portion of the supporting bracket.

Fig. 5 is a vertical section.

In the present case, I have shown the improvements applied to a plow colter, although, as before stated, the invention is also applicable to other forms of ground working disks, such as the usual concavo-convex furrow opening disks employed in connection with grain drills. The support in the present case is of a forked or bifurcated nature, the members of which are represented by 1, although the improvements are equally applicable to a bearing for a disk which is supported at one side of a single drag-bar or support as is now more generally used in connection with disk furrow openings for grain drills. The axle is preferably cast in a single piece and is formed with an enlarged centrally-arranged chambered portion 2 and reduced hollow side extensions 3. The axle thus formed is clamped between the bifurcated supporting members 1 by the bolt 4 and its nut 5, which extends through the axle as shown in Fig. 5. The inside of each supporting member 1 is preferably provided with a tapered recess 6, as shown in Figs. 4 and 5 and the ends of the axle extensions 3 are likewise tapered to fit these recesses. Each supporting member also has a lug 7 fitting a recess 8 in the end of each axle extension to prevent the axle from turning; one of the supporting members having a lateral projection 9 which projects over the head of the bolt to likewise prevent the bolt from turning.

The disk 10 has secured thereto hub members 11, each hub member being formed with a peripheral flange 11$^a$ provided with integrally formed rivets 12 and alternating openings 13, the rivets of each hub member projecting through the disk into the openings of the flange of the opposite hub member to firmly secure the hub and disk together. Paper washers (not shown) are preferably inserted between the hub flanges and the disk to make an oil tight joint.

The hub sections are shaped to conform themselves to the exterior of the enlarged portion of the axle and to that end are extended inwardly as indicated at 11$^b$ so as to project in close proximity to the axle extensions 3, as shown in Fig. 5. Caps 14 are provided on each side of the hub for the purpose of excluding dust, these caps being spring-pressed against the walls 11$^b$ of the hub by springs 15, interposed between the caps and the supports 1, the caps having small projections 16 which fit grooves 17 in the axle extensions to prevent the caps from turning. The axle extensions 3 are provided with openings 18 through which oil may be inserted into the interior of the chamber of the axle, these openings being ordinarily closed by the caps 14, the caps being pressed back against the tension of the springs in order to expose the openings for filling purposes. The central chambered portion of the axle is provided with openings 19 to permit the oil on the interior of the chamber to find its way to the wearing surfaces between the axle and the hub.

By referring to Fig. 5, it will be seen that the bottom of the chamber in the axle extends well below those portions of the bearing surfaces from which the oil can escape, and that the hub incloses the wearing surface of the axle to a point above the bottom of the chamber; the lowest point on the bearing surfaces which would permit the escape of the oil being that place where the smallest diameter of the hub section meets the axle extensions, as indicated at 20 in Fig. 5.

From this arrangement it will be apparent that it is possible to have the interior of the bearing contain a considerable quantity of lubricating oil which will find its way to the wearing surfaces through the openings 19 and gravitate along the outer sides of the chambered portion of the axle and the inner walls of the hub portions 11$^b$ until it finds its level with the oil in the chamber. So long as the level of the oil in the chamber is not above the points 20, it will be apparent that the oil will not escape from the bearing to any appreciable extent.

Having thus described my invention, I claim:—

1. In a bearing of the character described, an axle provided with an oil chamber, and a disk hub journaled on said axle about said chamber, said hub being extended inwardly toward the axis of said axle so as to inclose the bearing surface of said axle to a point above the bottom of said chamber in the working position of the parts, said chamber having an oil passageway leading to the bearing surfaces between the same and said hub.

2. In a bearing of the character described, an axle provided with an enlarged oil chamber, and a disk hub journaled on said axle about said chamber with the smaller portion of said axle projecting through said hub, said hub being extended inwardly toward the axis of said axle and about the smaller portion thereof so as to inclose the bearing surface of said axle to a point above the bottom of said chamber in the working position of the parts, said chamber having an oil passageway leading to the bearing surfaces between the same and said hub.

3. In a bearing of the character described, an axle provided with an enlarged circular centrally-arranged chambered portion, a bifurcated support between which said axle is clamped, a disk hub rotatably mounted upon the chambered portion of said axle and having its walls extended inwardly toward the axis of said axle so as to inclose the wearing surface of said axle to a point above the bottom of the chambered portion thereof, the chambered portion of said axle having an oil passageway leading to the bearing surfaces between the same and said hub.

4. In a bearing of the character described, an axle formed with an enlarged circular centrally-arranged chambered portion and reduced hollow extensions on each side thereof, a bifurcated support between which said axle is clamped, and a disk hub journaled on the enlarged portion of said axle with its sides extended toward the axis of said axle to a point above the bottom of the chambered portion of said axle, said chambered portion having an oil passageway leading from the bottom thereof to the bearing surface between the same and said hub.

5. In a bearing of the character described, an axle formed with an enlarged circular centrally-arranged chambered portion and reduced hollow extensions on each side thereof, a bifurcated support between which said axle is clamped, a disk hub journaled on the enlarged portion of said axle with its sides extended toward the axis of said axle to a point above the bottom of the chambered portion of said axle, said chambered portion having an oil passageway leading from the bottom thereof to the bearing surface between the same and said hub, and a spring pressed cap bearing against said hub on each side thereof.

6. In a bearing of the character described, an axle provided with a large circular centrally-arranged chambered portion and reduced side hollow extensions, a bifurcated support, a bolt extending through said support and axle to clamp the axle in position, interlocking projections between said support and axle to prevent the axle from turning, a disk hub journaled upon the enlarged portion of said axle and inclosing the sides of the same, the side walls of said hub being extended toward the axis of said axle to a point above the bottom of the chambered portion thereof, and an oil passageway leading from the chambered portion of said axle to the bearing surfaces between the same and said hub.

7. In a bearing of the character described, an axle provided with a large circular centrally-arranged chambered portion and reduced side hollow extensions, a bifurcated support, a bolt extending through said support and axle to clamp the axle in position, interlocking projections between said support and axle to prevent the axle from turning, a disk hub journaled upon the enlarged portion of said axle and inclosing the sides of the same, the side walls of said hub being extended toward the axis of said axle to a point above the bottom of the chambered portion thereof, an oil passageway leading from the chambered portion of said axle to the bearing surfaces between the same and said hub, and a spring-pressed dust cap on each side of said hub to inclose the space between the side walls thereof and the axle extensions.

8. In a bearing of the character described, an inner bearing member and an outer bearing member, the inner member being provided with an oil reservoir, said outer member surrounding said reservoir and being extended toward the axis of said reservoir member to a point above the bottom of the reservoir thereof, said reservoir having an oil passageway leading to the bearing surfaces between said bearing members.

In testimony whereof, I have hereunto set my hand this 14th day of March, 1918.

WILLARD A. VAN BRUNT.

Witnesses:
JOHN N. METCALF,
WM. H. SCHOENAU.

Copies of this patent may be obtained for five cents each, by addressing the "Commissioner of Patents, Washington, D. C."